(12) United States Patent
Sawayanagi

(10) Patent No.: US 6,340,193 B1
(45) Date of Patent: Jan. 22, 2002

(54) BRACKET FOR INSTALLATIONS OF SUBSIDIARY APPLIANCE ONTO VEHICLE BODY

(75) Inventor: Masahiro Sawayanagi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/705,830

(22) Filed: Nov. 6, 2000

(30) Foreign Application Priority Data

Nov. 10, 1999 (JP) .......................................... 11-319662
Nov. 10, 1999 (JP) .......................................... 11-319692
Nov. 10, 1999 (JP) .......................................... 11-319698

(51) Int. Cl.[7] .................................................. B60J 3/00
(52) U.S. Cl. .................................... 296/97.9; 248/274.1
(58) Field of Search ...................... 296/97.9; 248/274.1, 248/288.1, 289.1; 362/490

(56) References Cited

U.S. PATENT DOCUMENTS 5,098,151 A * 3/1992 Peterson ..................... 296/97.9
5,857,728 A * 1/1999 Crotty, III .................. 296/97.9
6,220,645 B1 * 4/2001 Jacquemin ............... 296/97.12

* cited by examiner

Primary Examiner—Dennis H. Pedder
(74) Attorney, Agent, or Firm—Finnegan, Henderson, Farabow, Garrett & Dunner, L.L.P.

(57) ABSTRACT

A bracket for installing a subsidiary appliance onto a vehicle panel comprising: a panel side bracket having a male connector; a sun visor side bracket having a female connector to which a terminal of sun visor side wire introduced from a shaft fixing portion is connected, said female connector being engaged with and connected to a male connector when the sun visor side bracket is united with said panel side bracket, and a cover having grommet screw protrusions to be inserted into central holes in the grommet screws and to be mounted on the sun visor side bracket. The panel side bracket has locking pieces each having a lock pawl and the sun visor bracket contains hole portions each in which a locking piece is to be inserted, so that a flexible space is formed with a lock arm having an engaging convex portion for engaging with the locking piece facing the hole portion, while the lock pawl engages with the engaging convex portion so that the panel side bracket is united with the sun visor side bracket.

11 Claims, 17 Drawing Sheets

FIG.19A
FIG.19B
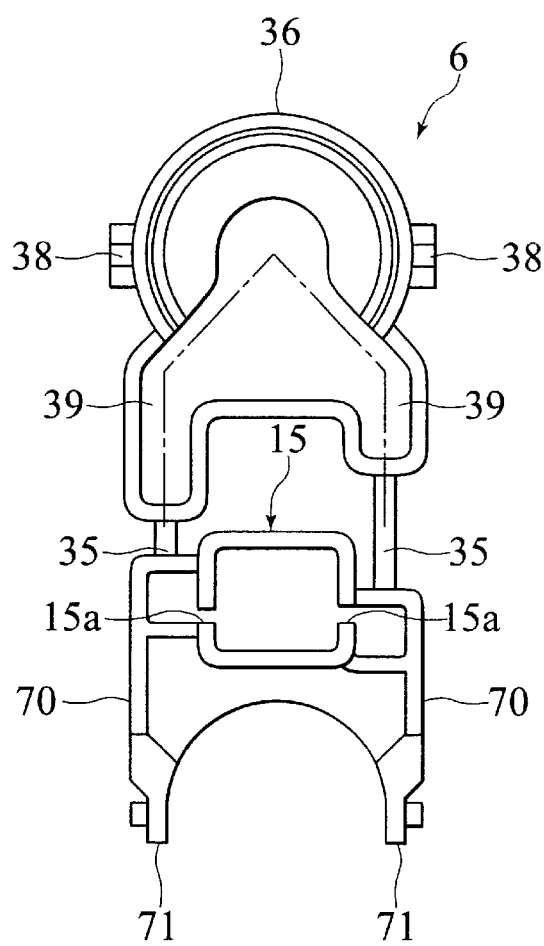
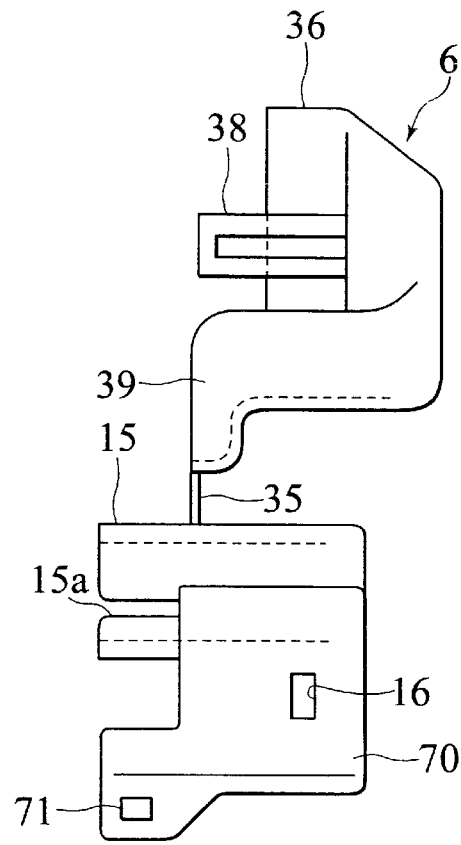

BRACKET FOR INSTALLATIONS OF SUBSIDIARY APPLIANCE ONTO VEHICLE BODY

BACKGROUND OF THE INVENTION

1. Field of the Invention

The present invention relates to a bracket for installing such a subsidiary appliance as a sun visor provided with an electrical device onto an inner panel of vehicle body, and more particularly a bracket for installation of a subsidiary appliance to the vehicle body onto the panel, the bracket enabling the installation to be carried out by a single action and supply of electricity to the electric appliance.

2. Description of the Related Art

Conventionally, as the subsidiary appliances provided in vehicle, for example, a sun visor installed on a ceiling along an upper end of a front window, a room lamp movably installed on the ceiling and the like are used. Some type of the sun visor contain a vanity mirror and some type of the sun visor further contains a lamp which enables such a vanity mirror to be used even at night.

FIGS. 1–18 indicate technologies which the inventor of the present invention and other related people considered. For example, a sun visor 101 having such a lamp, as shown in FIG. 1, contains a bracket 102 provided at an end of a fixing shaft 103 for fixing the sun visor 101 onto a vehicle body and the sun visor 101 is fixed by screwing the bracket 102 to an inner panel 104.

Hereinafter, a method for fixing the sun visor 101 to the inner panel 104 will be described below. First, as shown in FIGS. 1, 2, a wire harness 107 is introduced into vehicle compartment from a hole portion 106 formed in the inner panel 104 at an upper end of a front window 105 and then, a connector 110 attached to an end of wire 109 introduced from the aforementioned bracket 102 is coupled with a connector 108 provided at an end of the wire harness 107. In FIG. 3, the connector 110 accommodates a terminal 150 fixed to the end of the wire harness 109. This connector 110 has a double engaging spacer 151 which is a lance for preventing the terminal 150 from being slipped out of the connector 110 and detecting a non-engagement of the terminal 150. This double engaging spacer 151 is mounted in a spacer mounting hole portion 152 which goes through to a terminal accommodating chamber in the connector 110 so as to prevent the aforementioned terminal 150 from being slipped out of the connector 110 and detect whether or not the terminal 150 is accommodated at a predetermined position of the connector 110.

Next, the coupled connectors 108, 110 and wire harness 107 are brought into a space portion 112 between the inner panel 104 and the outer panel 111 through a hole portion 106 formed in the inner panel 104 so as to install the sun visor 101. That is, by bringing the connectors 108, 110 and wire harness 107 into the space portion 112 as shown in FIG. 4, a grommet screw 113 formed on the bracket 102 is inserted into a bracket mounting hole 114 (see FIG. 1) formed in the inner panel 104 and the aforementioned bracket 102 is pressed into the inner panel 104.

Next, as shown in FIG. 5, a screw 115 is inserted into a central hole in the cylindrical grommet screw 113 and tightened. Consequently, as shown in FIGS. 6, 7, an end portion of the grommet screw 113 is expanded by the screw 115 by means of a slit 118 formed in height direction from the end of the grommet screw 113, so that divided pieces 116, 116 of the expanded grommet screw 113 are pressed against an opening peripheral portion of the bracket mounting hole 114. Consequently, the bracket 102 is fixed to the inner panel 104.

After the tightening of the screw is completed, as shown in FIGS. 5, 7, a cover 117 is mounted onto the bracket 102 to hide the screw 115 on the bracket 102. In this working process, the sun visor 101 is fixed to the inner panel 104.

However, if the sun visor 101 is fixed in the above described way, even if the connectors 108, 110 are installed in incomplete coupling condition (incomplete engaging condition), it cannot be confirmed. Further, even if the connectors 108, 110 are slipped out due to vibration generated by traveling of vehicle, it cannot be confirmed until the sun visor 101 is removed.

If as shown in FIG. 7, a triangular bracket 102 is used, it is difficult to confirm an installation direction of the cover 117. As a result, working efficiency for the installation is low and there is a fear that the cover 117 may be installed in improper direction. Consequently, the cover 117 may become loose or generate abnormal noise.

Further, if the screw 115 is tightened obliquely as shown in FIG. 8, there is a fear that the wire harness 107, wire 109 and connectors 108, 110 may be hooked by a screw portion protruded from an end of the grommet screw 113 so that they may be damaged.

Further, because the installation is carried out by tightening the screw 115, the sun visor 101 has to be held by a single hand during the tightening of the screw. Thus, not only that screw tightening work is very troublesome but also the quantity of necessary parts increases. Additionally, there is a fear that a worker may use a screw of different size so that it may damage the grommet screw 113 or bracket mounting hole 114.

If the sun visor is installed using the bracket 102 described above, the united object of the connector 110 and mating connector 108 is movable in a space between the inner panel 104 and the outer panel 112, so that abnormal noise may be generated during a traveling of the vehicle.

Further, when it is intended to couple the mating connector 108 with the connector 110, the worker has to couple a connector connected to the bracket 102 with the mating connector 108 disposed in the space portion between the inner panel 104 and the outer panel 112 by groping. Thus, there is a problem that the worker has to be skilled in this coupling work.

Further, because the wire harness 109 is placed out between an end 103a of the fixing shaft 103 and the connector, there is a fear that when it is intended to install the bracket 102 to the inner panel 104, this wire harness 109 may be bit between the bracket 102 and the inner panel 104.

SUMMARY OF THE INVENTION

Accordingly, the present invention has been achieved to solve the aforementioned problem and therefore, an object of the present invention is to provide a bracket for installation of the subsidiary appliance onto the vehicle body which enables to confirm visually a coupling condition of connectors and is capable of eliminating incomplete coupling of the connectors and preventing a cover from being installed in a wrong direction, thereby preventing an occurrence of abnormal noise during a traveling of the vehicle.

Another object of the present invention is to provide a bracket for installation of the subsidiary appliance onto the vehicle body, which enables the bracket to be installed onto the panel by a single action without a necessity of tightening screws, thereby not damaging wire, wire harness, connectors and the like.

To achieve the above object, according to a first aspect of the present invention, there is provided a bracket for installing a subsidiary appliance onto a vehicle panel comprising: a first bracket having a first connector; a second bracket having a second connector which is coupled with the first connector when the second bracket is united with the first bracket and cylindrical grommet screws which are inserted into bracket mounting holes formed in the vehicle panel and engaged with the vehicle panel; and a cover to be mounted on the second bracket on an opposite side to a side with which the first bracket is to be united, wherein the first bracket has locking pieces each having a lock pawl and the second bracket contains hole portions in which the locking piece is to be inserted, so that a flexible space is formed with a lock arm having an engaging convex portion for engaging with the locking piece facing the hole portion, while the lock pawl engages with the engaging convex portion so that the first bracket is united with the second bracket.

According to the first aspect, the locking pieces formed on the first bracket having the first connector are inserted into the hole portions formed in the second bracket having the second connector and then, the lock pawl on each locking piece is engaged with the engaging convex portion of the lock arm provided so as to face the hole portion. Consequently, the first bracket and the second bracket are united with each other so that the first connector is coupled with the second connector. In this way, only by uniting the first bracket and the second bracket with each other, the first connector and second connector provided on the respective brackets can be coupled with each other.

According to a second aspect of the present invention, there is provided a bracket for installing a subsidiary appliance onto a vehicle panel according to the first aspect wherein the cover has locking protrusions which are to be inserted into the flexible space so as to press the lock arms against the locking pieces.

According to the second aspect, by inserting the locking protrusion formed on the cover into the flexible space formed in the second bracket, the lock arm is urged toward the locking piece by the locking protrusion, so that an engagement force between the lock pawl and the engaging convex portion is further intensified. Consequently, the uniting force of the first bracket and second bracket is increased.

Because according to the second aspect, the engagement between the lock pawl and the engaging convex portion cannot be released until the cover is removed, connection failure due to connector slip-out can be avoided.

According to the second aspect, if the engagement between the lock pawl and the engaging convex portion is improper, the lock arm is pressed by the lock pawl, so that the flexible space becomes smaller or vanishes. Consequently, the locking protrusion formed on the cover cannot enter the flexible space, thereby indicating that the engagement between the first connector and the second connector is improper. That is, an engaging condition between the first connector and the second connector can be detected. Further, the engaging condition between the lock pawl and the engaging convex portion can be confirmed visually through the hole portion formed in the second bracket even if the cover is not removed, and further, the engaging condition can be confirmed visually depending on the size of the flexible space.

Further, because according to the second aspect, the locking protrusion is inserted into the flexible space when the cover is installed onto the second bracket, if the direction of the cover is wrong, it cannot be installed to the second bracket, thereby making it possible to prevent an improper mounting of the cover.

According to a third aspect of the present invention, there is provided a bracket for installing a subsidiary appliance onto a vehicle panel according to the first aspect wherein the cover has a grommet screw protrusion to be inserted into a central hole in the grommet screw and an end of the grommet screw protruded to a face on an opposite side to the bracket mounting face of the vehicle panel through the bracket mounting hole is pressed and expanded by the grommet screw protrusion so as to be pressed against an opening peripheral portion of the bracket mounting hole so that the bracket for installation onto the vehicle is fixed to the vehicle panel.

According to the third aspect, when the grommet screw protrusion formed on the cover is inserted into the central hole in the grommet screw formed on the second bracket, the end portion of the grommet screw protruded to an opposite face to the bracket mounting face of the vehicle panel from the bracket mounting hole is pressed and expanded by the grommet screw protrusions so as to be pressed against the opening peripheral portion. Consequently, the bracket for installation onto the vehicle is fixed to the vehicle panel. That is, the bracket can be fixed onto the vehicle panel simply and securely by a single action of mounting the cover to the second bracket.

According to the fourth aspect of the present invention, there is provided a bracket for installing a subsidiary appliance onto a vehicle panel according to the first aspect wherein the cover has a fitting pawl formed so as to engage with the second bracket.

According to the fourth aspect, because the fitting pawl to be fit to the second bracket is formed on the cover, the cover is mounted to the second bracket firmly, thereby eliminating a possibility of looseness and vibration.

According to a fifth aspect of the present invention, there is provided a bracket for installing a subsidiary appliance onto a vehicle panel according to the first aspect wherein the subsidiary appliance is a sun visor disposed on a vehicle roof portion.

According to the fifth aspect, in addition to an operation of the first–fourth aspect, by forming the first connector for holding the second bracket in general purpose style, a structure of the second bracket or cover located in the vehicle compartment can be changed appropriately depending on a roof structure. Further, by preventing an occurrence of abnormal noise from a place near passengers, the high quality feeling of the vehicle can be improved.

According to a sixth aspect of the present invention, there is provided a bracket for installing a subsidiary appliance onto a vehicle panel according to the fifth aspect wherein the second connector is held detachably by the second bracket.

According to the sixth aspect, in addition to an operation of the first–fifth aspect, because the second bracket is separate from the first connector, material thereof can be selected appropriately depending on the characteristic required thereto. As a result, entire cost of the subsidiary appliance can be reduced.

According to a seventh aspect of the present invention, there is provided a bracket for installing a subsidiary appliance onto a vehicle panel, comprising: a first bracket having a first connector; and a second bracket having a shaft fixing portion for supporting a fixing shaft provided on the subsidiary appliance and a second connector in which a wire from the subsidiary appliance is introduced from said shaft fixing portion and a terminal of the wire is connected, wherein said first bracket is disposed between said second bracket and a vehicle panel and said first bracket is engaged with and connected to the second connector held by the second bracket, wherein said second bracket has grommet screws protruded and by inserting the grommet screw protrusion into the grommet screw in a condition that the grommet screw goes through said first bracket and said vehicle panel, said first bracket is nipped and fixed between said second bracket and said vehicle panel.

According to the seventh aspect, the second connector is held by the subsidiary appliance bracket with the subsidiary appliance wire connected to the second connector and then, by overlaying the panel side bracket on the subsidiary appliance side bracket, the first connector and the second connector can be connected to each other. Further, by inserting the grommet screw protrusions into the grommet screws in the condition that the grommet screws formed on the second bracket go through the first bracket and vehicle panel, the first bracket is nipped by the second bracket and vehicle panel, so that the bracket entirely can be installed and fixed. Thus, according to the first aspect, any looseness never occurs between the first connector and the second connector thereby preventing an occurrence of abnormal noise. Further, because the first bracket is nipped by the vehicle panel and the second bracket, the first connector and second connector can be connected to each other securely.

According to an eighth aspect of the present invention, there is provided a bracket for installing a subsidiary appliance onto a vehicle panel according to the seventh aspect wherein the second connector comprises a cap portion for covering a top portion of the shaft fixing portion and a wire cover portion for covering wire on subsidiary appliance placed from the shaft supporting portion to the second connector.

According to the eighth aspect, in addition to an operation of the seventh aspect, because the wire on the subsidiary appliance introduced from the shaft supporting portion is covered with the cap portion and the wire cover portion, the wire on the subsidiary appliance can be prevented from being pulled out more than required from the shaft supporting portion. Therefore, according to the seventh aspect, the wire can be prevented from being bit by the panel.

According to a ninth aspect of the present invention, there is provided a bracket for installing a subsidiary appliance onto a vehicle panel according to the seventh aspect wherein the grommet screw protrusion is protruded from a cover for covering the second bracket.

According to the ninth aspect, in addition to an operation of the fifth and eighth aspect, by mounting the cover onto the second bracket, the second bracket can be fixed to the vehicle panel and the first bracket can be nipped between the vehicle panel and second bracket easily.

According to a tenth aspect of the present invention, there is provided a bracket for installing a subsidiary appliance onto vehicle panel according to the seventh aspect wherein the subsidiary appliance is a sun visor disposed on a vehicle roof portion.

According to the tenth aspect, in addition to an operation of the seventh–ninth aspect, by forming the first connector for holding the second bracket in general purpose style, a structure of the second bracket or cover located in the vehicle compartment can be changed appropriately depending on a roof structure. Further, by preventing an occurrence of abnormal noise from a place near passengers, the high quality feeling of the vehicle can be improved.

According to an eleventh aspect of the present invention, there is provided a bracket for installing a subsidiary appliance onto a vehicle panel according to the seventh aspect wherein the second connector is held detachably by the second bracket.

According to the eleventh aspect, in addition to an operation of the seventh-tenth aspect, because the second bracket is separate from the first connector, material thereof can be selected appropriately depending on the characteristic required thereto. As a result, entire cost of the subsidiary appliance can be reduced.

By fixing the bracket of the present invention to the panel in this way, any screw for fixing the bracket becomes unnecessary and further the procedure of tightening the screw also becomes unnecessary, thereby making it possible to reduce the quantity of parts and working steps. Further, because such screw tightening failure as oblique tightening is eliminated, an accident by short-circuit due to contact between the screw and wire or connector can be prevented. Further, a damage of the bracket due to screw size error can be also prevented.

BRIEF DESCRIPTION OF THE DRAWINGS

FIG. 19A is a plan view of a female connector used in the embodiment and FIG. 19B is a side view of the female connector according to the embodiment:

DETAILED DESCRIPTION OF THE PREFERRED EMBODIMENTS

Hereinafter, the preferred embodiment of the present invention will be described in detail with reference to the accompanying drawings.

[Structure of Bracket for Installation onto Vehicle]

Figure 1:
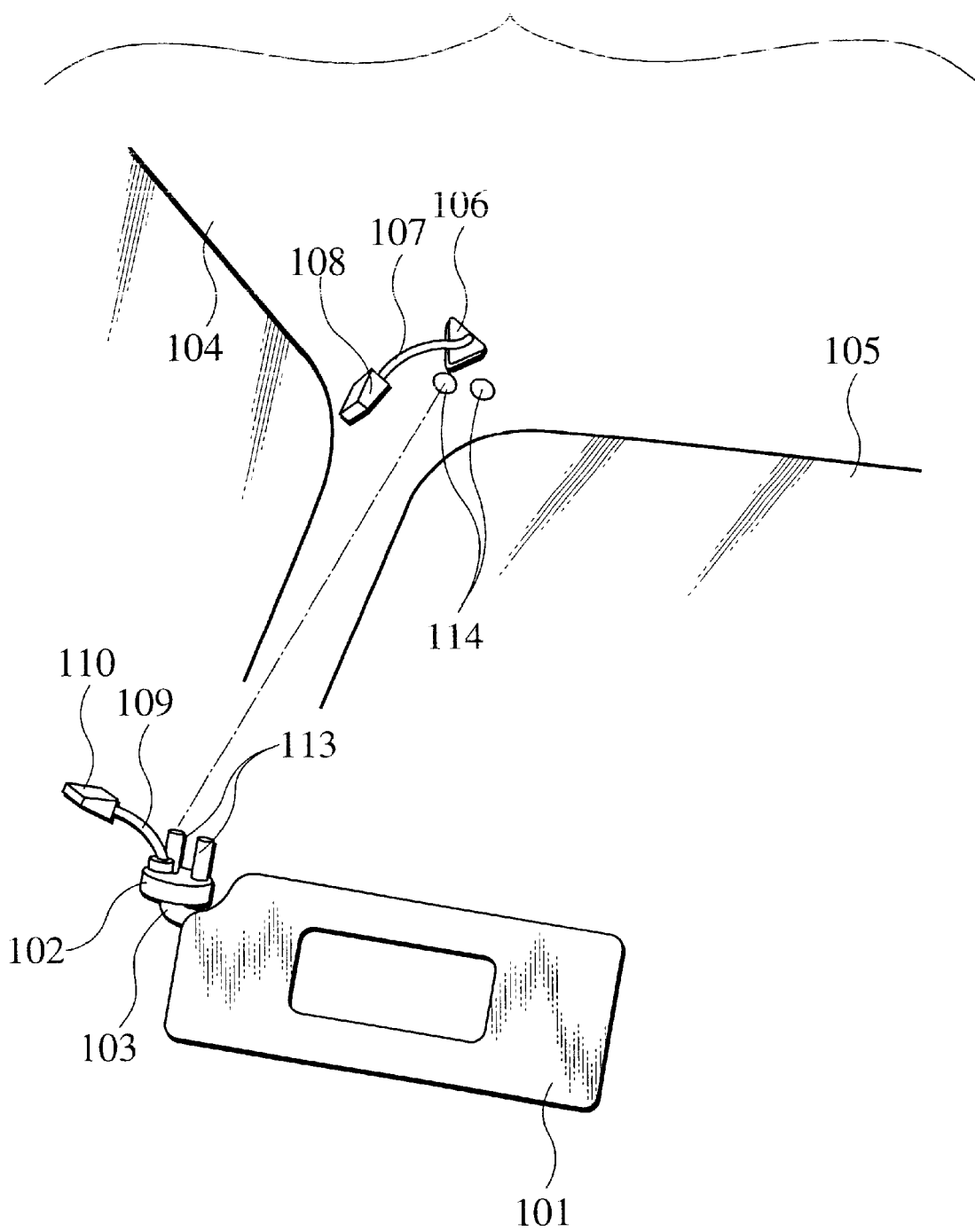
FIG. 1 is a perspective view showing a state before a sun visor is installed to an inner panel of vehicle using a bracket which the inventors of the present invention considered.
Figure 2:
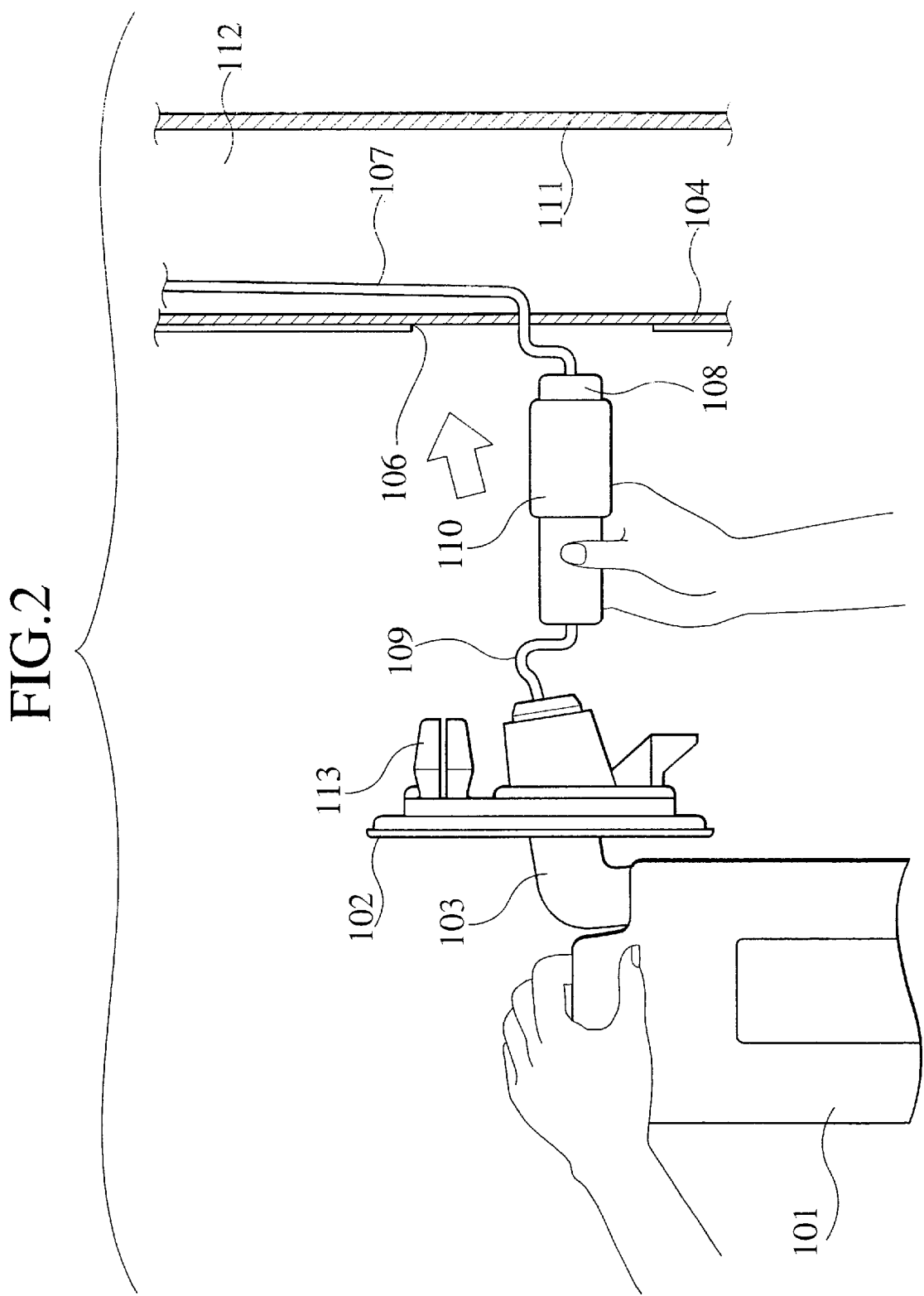
FIG. 2 is a diagram showing a condition in which a connector is coupled by hand which the inventors considered.
Figure 3:
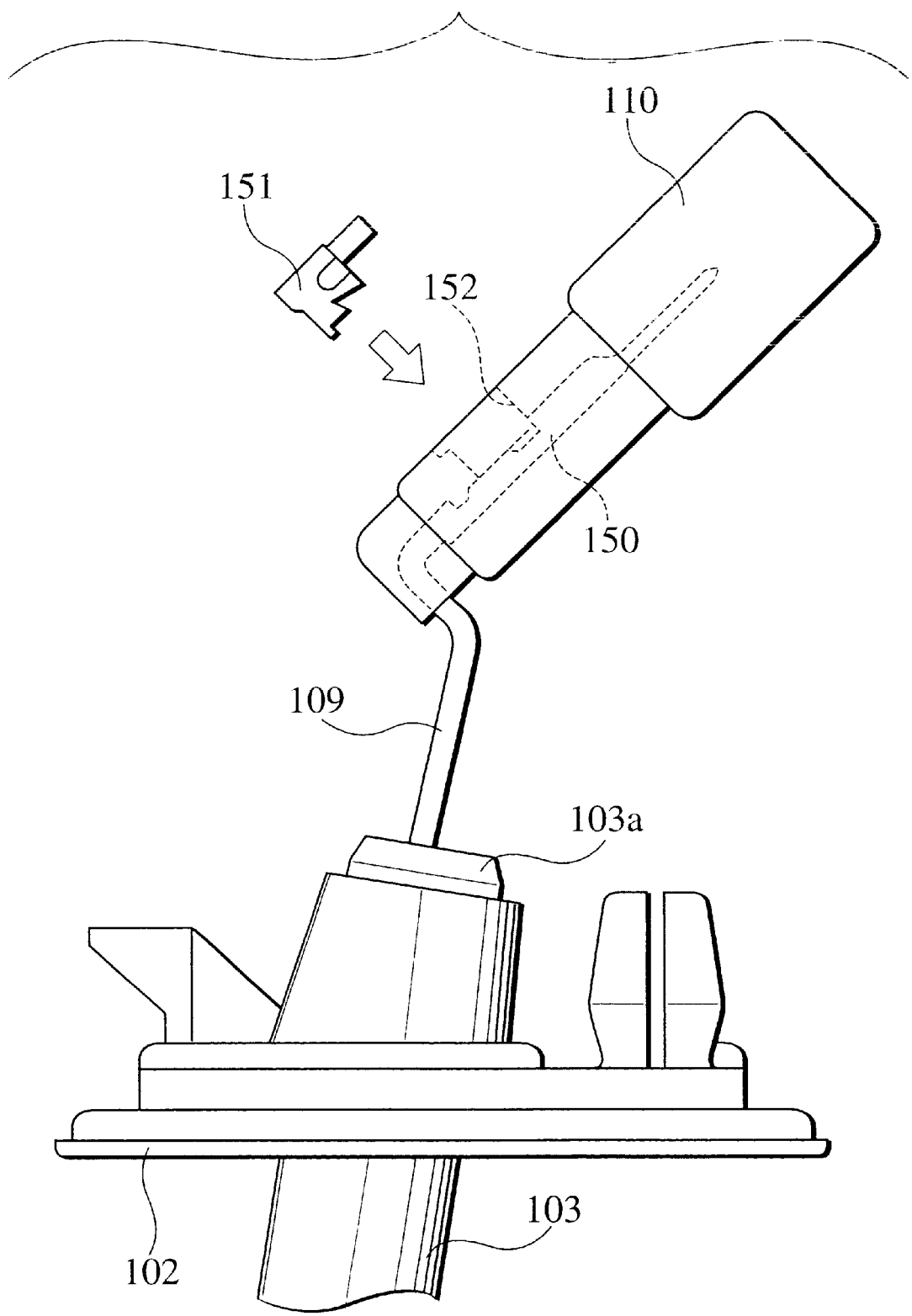
FIG. 3 is a side view of the bracket for installation onto the vehicle body which the considered.
Figure 4:
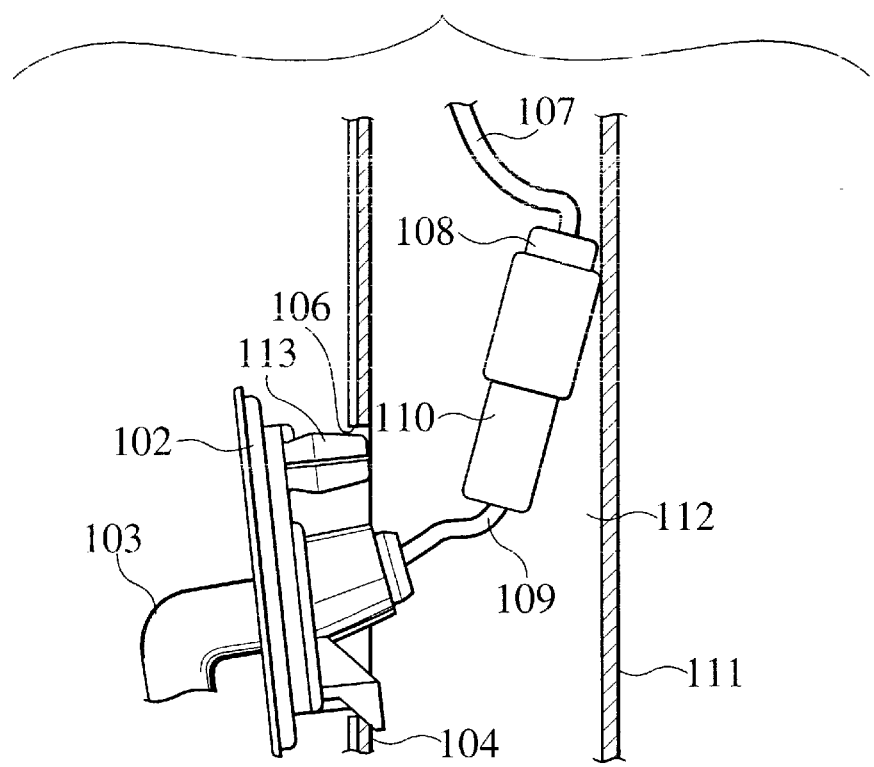
FIG. 4 is a sectional view showing a condition in which the bracket is pressed into the inner panel after the same coupled connector is accommodated in a space within the panel which the inventors considered.
Figure 5:
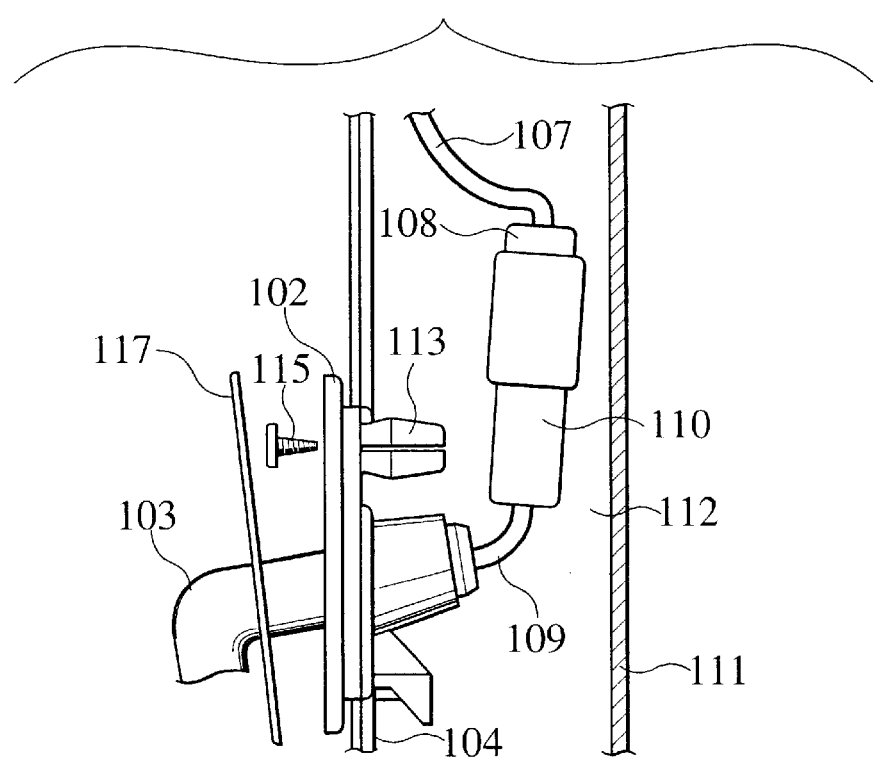
FIG. 5 is a sectional view showing a condition in which the same bracket is fixed to the inner panel with screws.
Figure 6A:
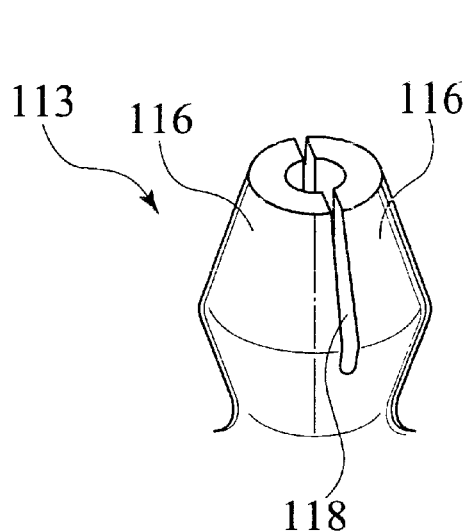
FIG. 6A is an enlarged perspective view showing a condition before a grommet screw is tightened and FIG. 6B is an enlarged perspective view showing a condition after the grommet screw is tightened which the inventors considered.
Figure 6B:
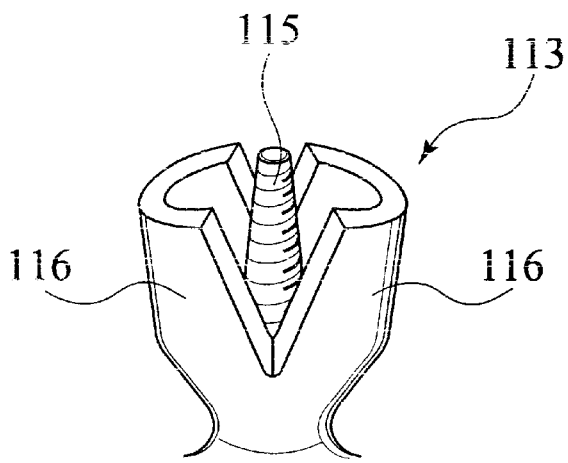
Figure 7:
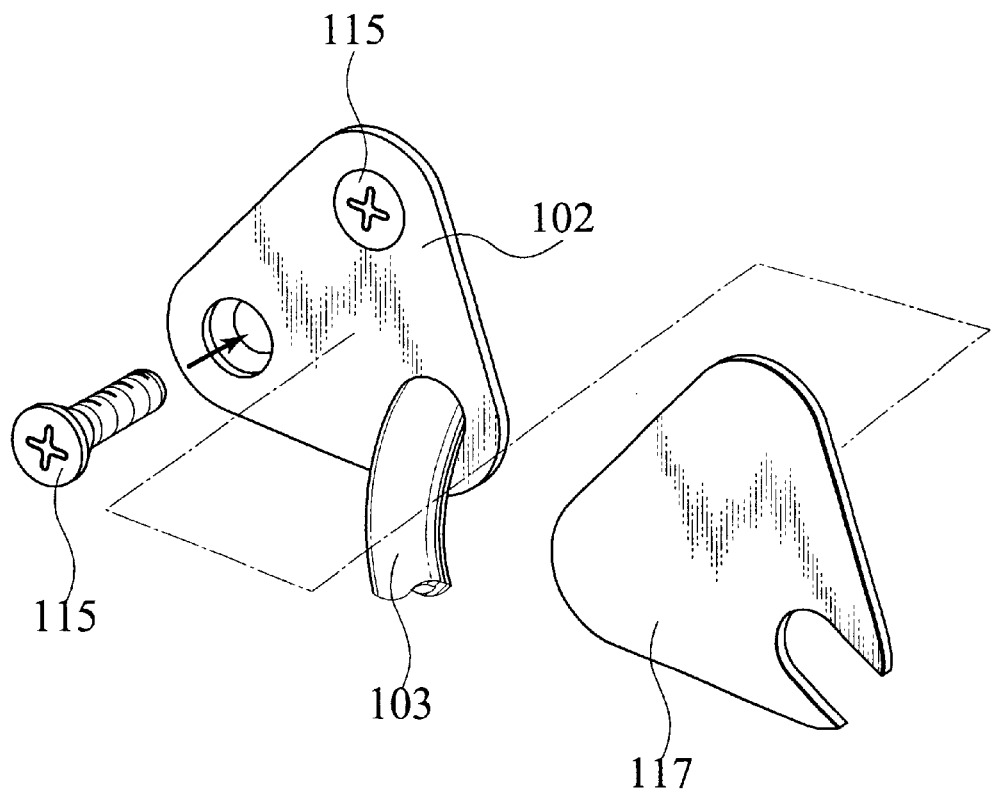
FIG. 7 is a disassembly perspective view showing a condition before a cover for hiding the screw is mounted which the inventors considered.
Figure 8:
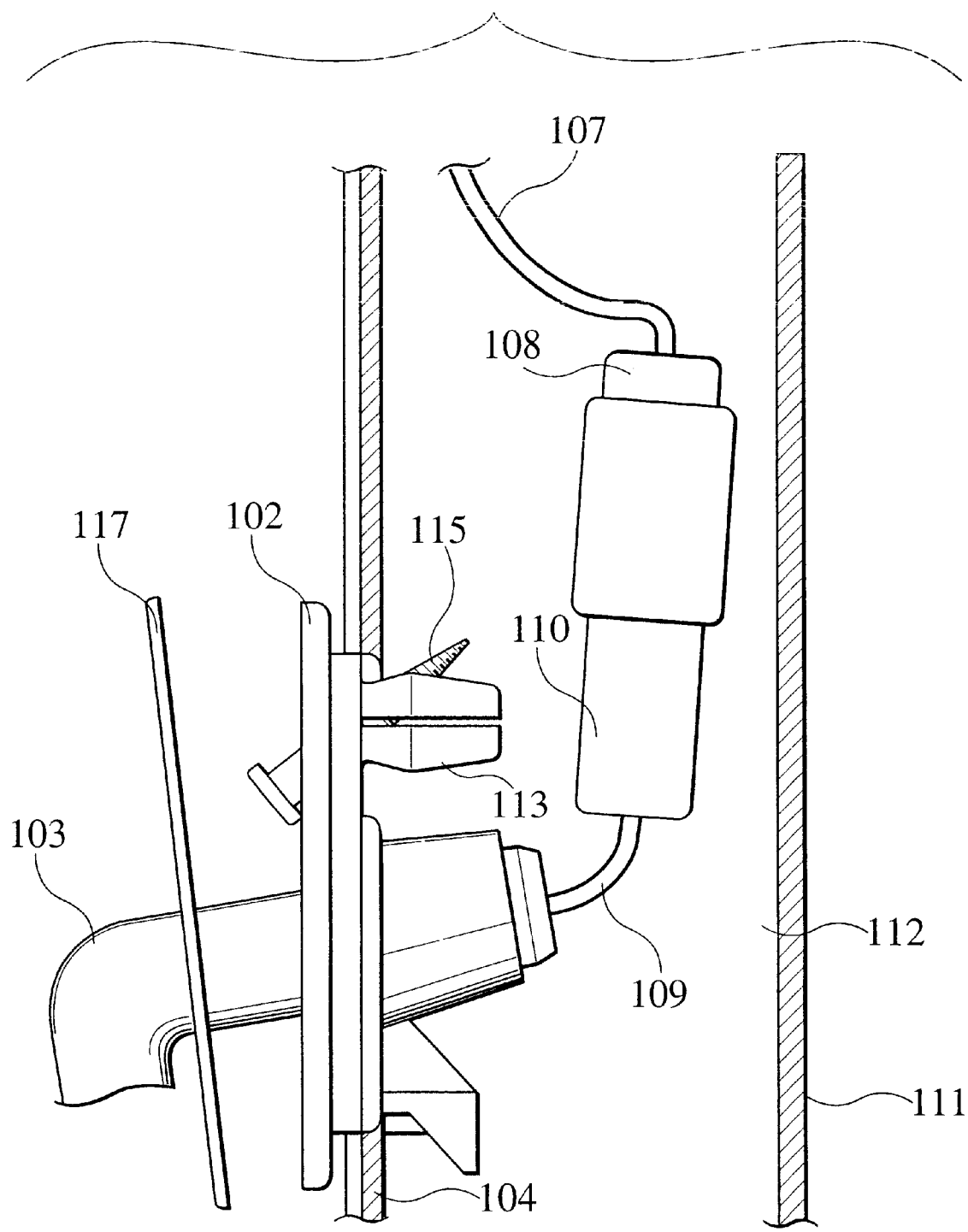
FIG. 8 is a sectional view showing a condition in which the grommet screw is tightened obliquely so that a tip of the screw is protruded out of a front end of the grommet screw which the inventors considered.
Figure 9:
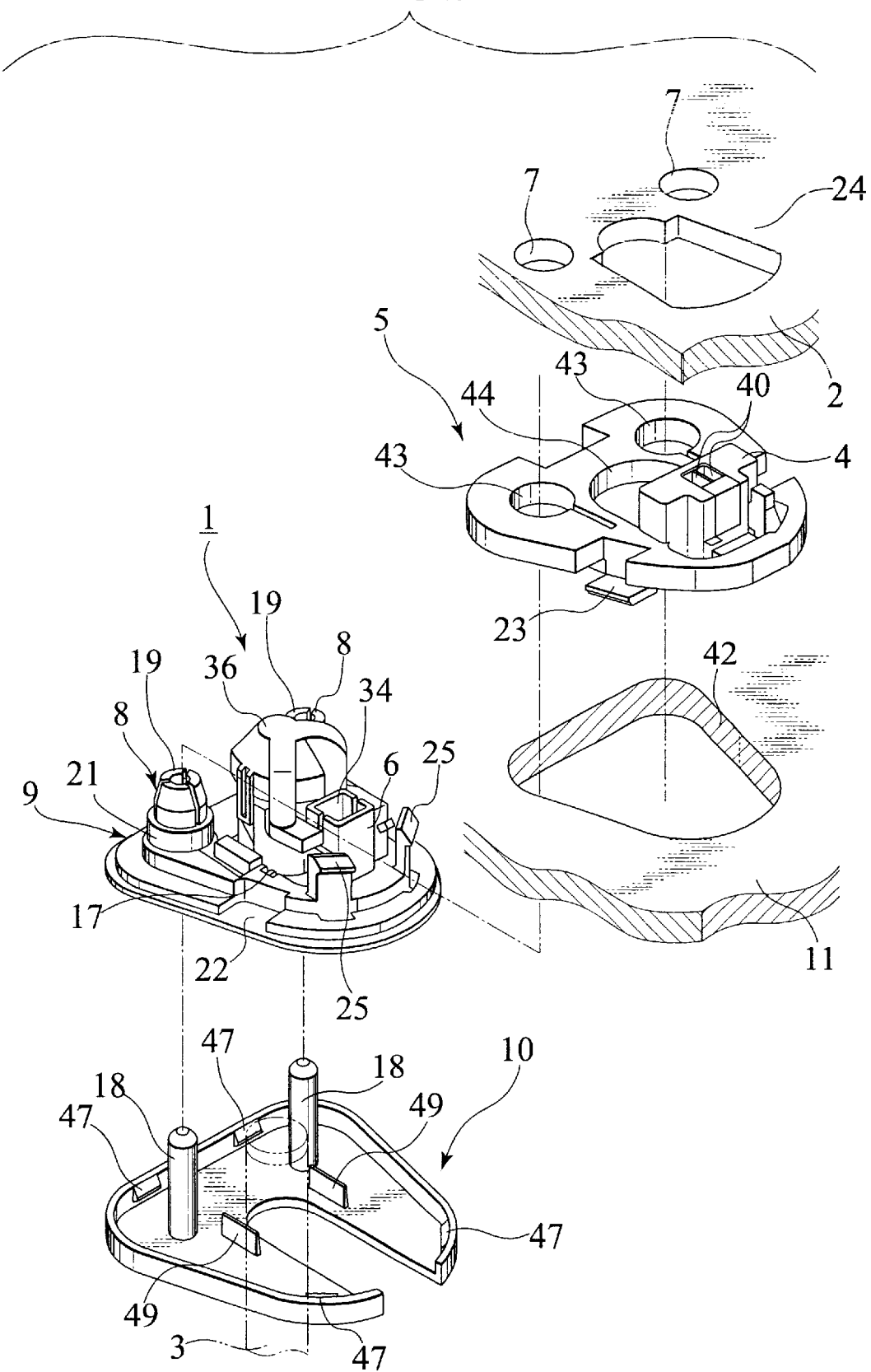
FIG. 9 is a disassembly perspective view of a bracket for installation of the subsidiary appliance according to an embodiment of the present invention.

As shown in FIG. 9, the bracket 1 for installation of the subsidiary appliance to the vehicle according to this embodiment is used for installing the sun visor (not shown) to the inner panel 2 of the vehicle and attached to a front end of the fixing shaft 3 for supporting the sun visor. The bracket 1 for installation onto vehicle comprises: a panel side bracket 5 which is a first bracket having a male connector 4 as a first connector; a visor side bracket 9 which is a second bracket having a female connector 6 as a second connector to be coupled with the male connector 4 when this visor side bracket is coupled with the panel side bracket 5 and cylindrical grommet screws 8, 8 to be inserted into bracket mounting holes 7, 7 formed in the inner panel 2 and engaged with the inner panel 2; and a cover 10 to be mounted on the visor side bracket 9 from the side of the vehicle compartment.

<Structure of Sun Visor Side Bracket>

Figure 10:
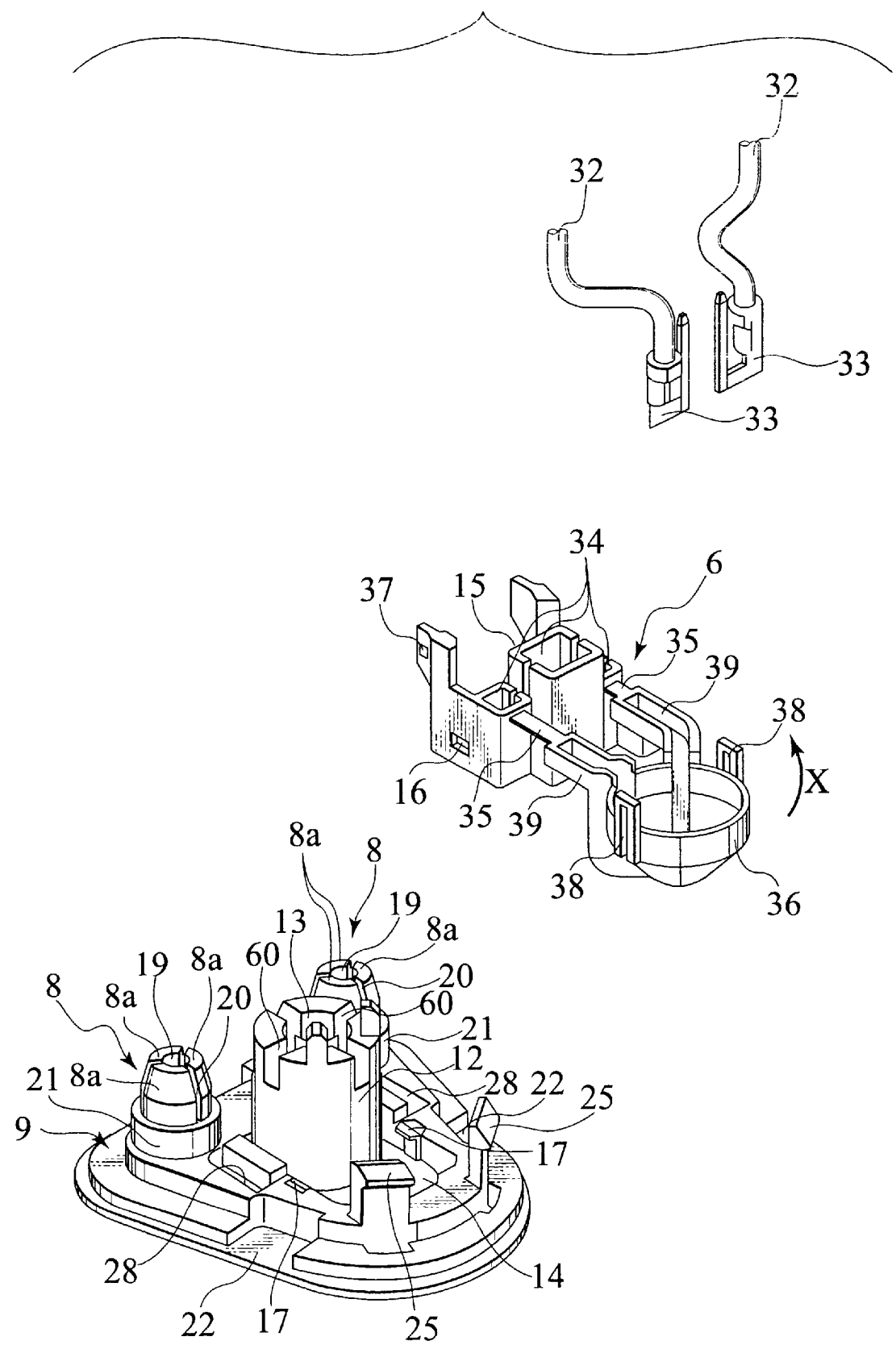
FIG. 10 is a disassembly perspective view of a second bracket and a second connector to be mounted on the bracket according to the embodiment.
Figure 16A:
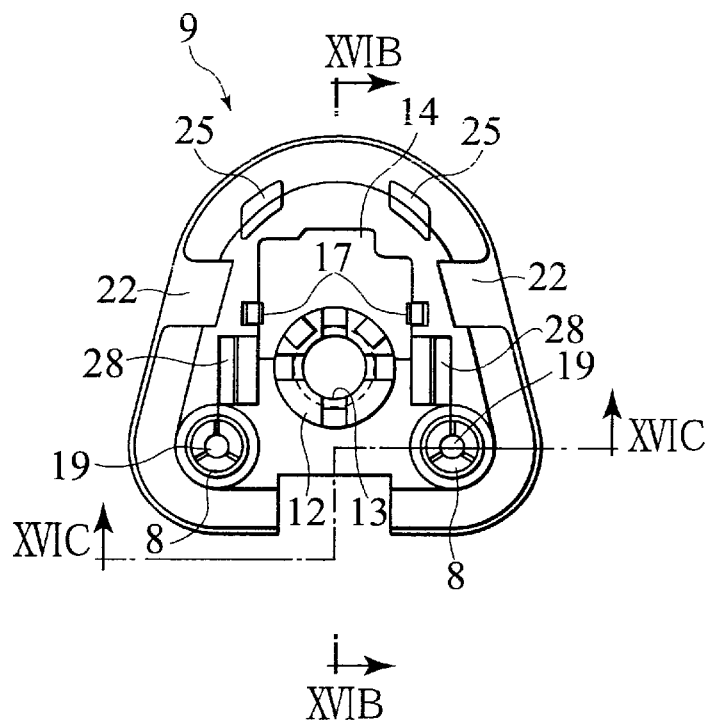
FIG. 16A is a plan view of the second bracket.
Figure 16B:
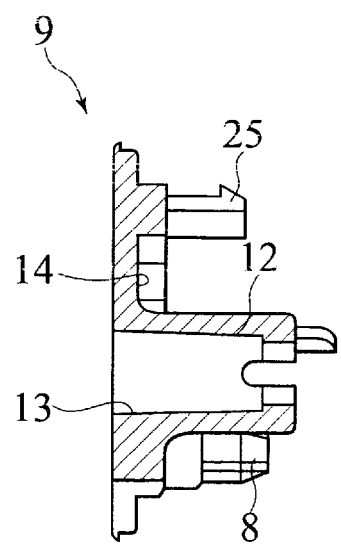
FIG. 16B is a sectional view taken along the line XVIB—XVIB and FIG. 16C is sectional view taken along the line XVIC—XVIC according to the embodiment.
Figure 16C:
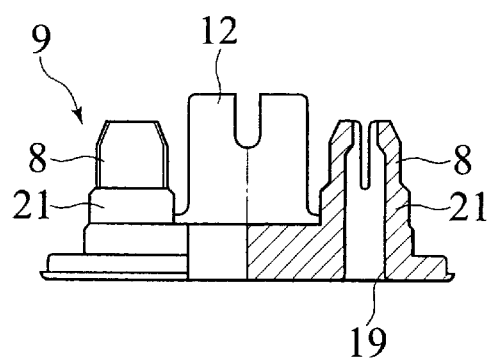

As shown in FIG. 9, the sun visor side bracket 9 is provided on an opposite side to the panel side bracket 5 across a trim 11, which is an interior material to be fixed on the inner panel 2, so that it is fixed to the inner panel 2. As shown in FIGS. 10, 16, the sun visor side bracket 9 has a shaft fixing portion 12 for holding a front end of the fixing shaft 3. The shaft fixing portion 12 is formed in the form of a cylinder having a shaft fixing hole 13, through which the fixing shaft 3 is to be inserted, in the center thereof. The fixing hole 13 of the shaft fixing portion 12 is formed so as to go through the sun visor side bracket 9. As shown in FIG. 9, the fixing shaft 3 of the sun visor is inserted from the side of the vehicle compartment and held in the fixing hole 13 of this shaft fixing portion 12. Further, as shown in FIG. 10, wire introducing cutouts 60, 60 are formed on a upper portion of the shaft fixing portion 12 such that they make a pair on both sides.

As shown in FIG. 10, a connector mounting portion 14 on which the female connector 6 is to be mounted is formed in the aforementioned sun visor side bracket 9. The connector mounting portion 14 is formed in the form of a concave portion which is located in front of the shaft fixing portion 12 and in which the female connector portion 6 is to be mounted. Then, the female connector portion 6 is mounted without any looseness. This connector mounting portion 14 has connector fixing lock pawls 17, 17 which enter locking hole portions 16 formed in the female connector housing 15 of the female connector portion 6 and fixes the female connector portion 6 to the sun visor side bracket 9.

Further, as shown in FIGS. 9, 16, the aforementioned sun visor side bracket 9 has the grommet screws 8, 8 which are inserted into the bracket mounting holes 7, 7 formed in the inner panel 2 so that they are secured by the inner panel 2. The grommet screws 8, 8 are formed in the form of a cylinder having a central hole 19 through which each of the grommet screw protrusions 18, 18 formed on the cover 10, which will be described later, is to be inserted. As for the diameter of the hole in each of the grommet screws 8, 8, the diameter of a upper portion thereof is smaller than that of a lower portion thereof. Each of the grommet screws 8, 8 has screw pieces 8a, 8a, 8a produced by dividing the cylindrical body to substantially three sections by means of slits 20 formed in a height direction of the grommet screw from a front end thereof up to a proximal end thereof.

Then, bracket supporting portions 21, 21 for supporting the aforementioned panel side bracket 5 are formed on the proximal end of each of the grommet screws 8, 8. The bracket supporting portions 21, 21 are formed in the form of a cylinder having a larger diameter than that of each of the aforementioned grommet screws 8, 8 and integrated with the proximal end of each of the grommet screws 8, 8. Each of the bracket supporting portion 21, 21 supports the panel side bracket 5 on a circular upper end face thereof.

Further, as shown in FIGS. 9, 16, the aforementioned visor side bracket 9 has uniting concave portions 22, 22 for uniting with the panel side brackets 5. The uniting concave portions 22, 22 are formed on both sides of the connector mounting portion 14, so that mounting pawls 23, 23 formed on the panel side bracket 5 are engaged with the uniting concave portions 22, 22 so as to position and unite the panel side bracket 5 with the sun visor side bracket 9.

As shown in FIGS. 9, 16, the sun visor side bracket 9 has hooking pawl portions 25, 25 which go through a connector insertion hole 24 formed in the inner panel 2 to face a space portion (not shown) between the inner panel 2 and the outer panel so as to be fit to an inner face of the inner panel 2.

Figure 11:
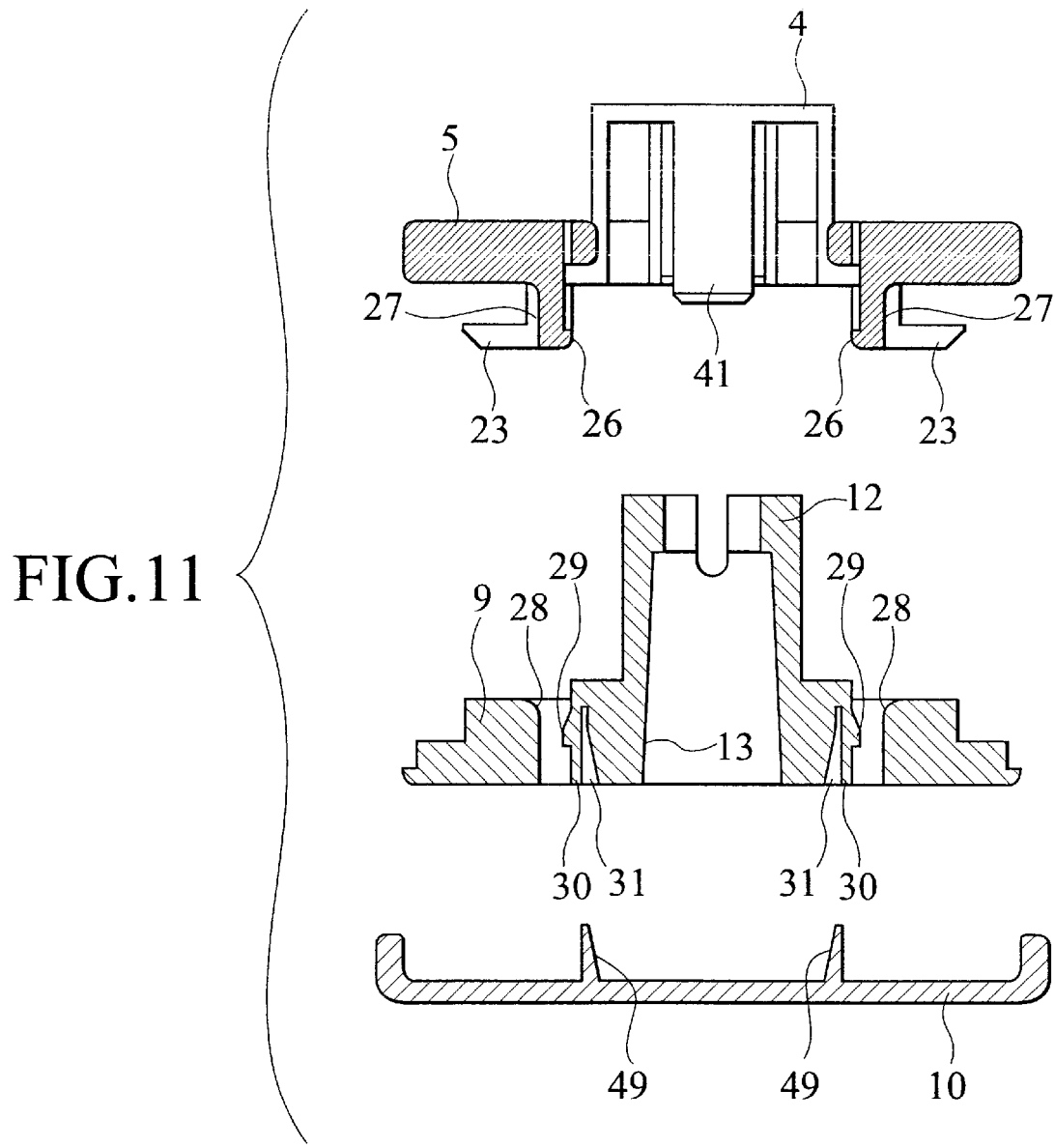
FIG. 11 is a sectional view of a first bracket, second bracket and cover according to the embodiment.

As shown in FIG. 11, the sun visor side bracket 9 contains hole portions 28, 28 through which lock pieces 27, 27 each having locking pawl 26, 26 formed on the panel side bracket 5 are to be inserted. In each of the hole portions 28, a lock arm 30 having an engaging convex portion 29 which engages with the aforementioned locking pawl, 26 is provided. Each of the lock arms 30, 30 is formed in the form of a tongue drooping from a side with which the panel side bracket 5 is to be united as a proximal end toward a rear side on which the cover 10 is to be mounted. Then, with a free end of the lock arm facing each of the aforementioned hole portions 28, 28, a flexible space 31 is formed between that free end and the sun visor side bracket 9.

As shown in FIGS. 10, 19, the female connector portion 6 to be installed to the sun visor side bracket 9 comprises: a rectangular solid female connector housing 15, terminal wire accommodating portions 34, 34; hinge portions 35 extending from a top portion of the other end of the terminal wire accommodating portion 34 toward the other side; wire cover portions 39, 39 formed integratedly with the other end of each of the hinge portion 35; a cap portion 36 formed integratedly on the other end of each of the wire cover portions 39, 39; side walls 70, 70 extended from each of the terminal wire accommodating portions 34, 34; and cap holding portions 71, 71 extended from a top portion of one end of each of the side walls 70, 70 such that they are located upward. Further, both side walls of the female connector housing 15 have slits 15a for inserting and disposing a female connector terminal 33 inside the female connector housing 15. Further, the side wall 70 contains the locking hole portion 16 which each of the connector fixing lock pieces 17 formed on the sun visor side bracket 9 is fit to. On both sides of an opening edge of the cap portion 36, cap engaging portions 38, 38 which engage with the cap holding portions 71, 71 when the hinge portions 35, 35 are bent are formed. By bending the hinge portions 35, 35 in the direction of an arrow X in FIG. 10 with the female connector housing 15 disposed in the connector mounting portion 14 of the sun visor side bracket 9, the freely movable cap portion 36 can be put on the shaft fixing portion 12.

<Structure of Panel Side Bracket>

Figure 17A:
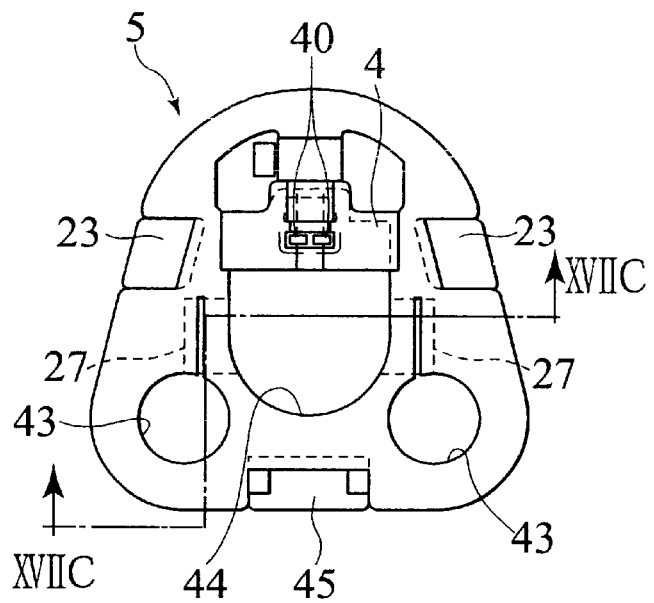
FIG. 17A is a plan view of the first bracket.
Figure 17B:
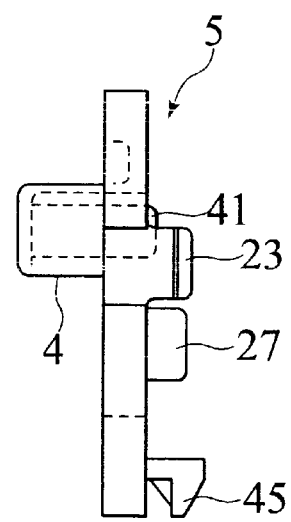
FIG. 17B is a right side view thereof and FIG. 17C is a sectional view taken along the line XVIIC—XVIIC according to the embodiment.
Figure 17C:
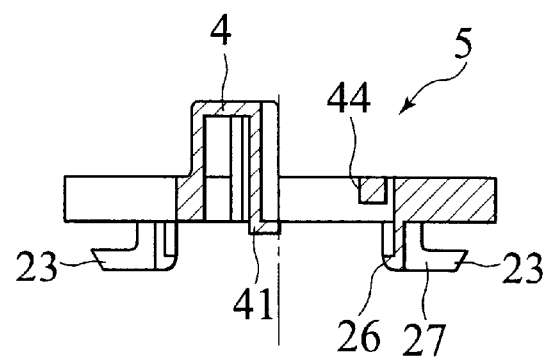

As shown in FIGS. 9, 17, the panel side bracket 5 is united with the sun visor side bracket 9 across the trim 11 so that the male connector portion 4 is coupled with the female connector portion 6. The panel side bracket 5 contains the male connector portion 4 intended to be coupled with the female connector portion 6 fixed on the sun visor side bracket 9. The male connector portion 4 has a male connector housing 41 containing a terminal accommodating chamber 40 for accommodating a terminal (not shown) connected to an end of wire harness placed in the space portion between the inner panel 2 and the outer panel. This male connector housing 41 is inserted into the female connector housing 15 of the aforementioned female connector portion 6 so that terminals of both are brought into electrical contact with each other.

The panel side bracket 5 has the mounting pawls 23, 23 which engage with the uniting concave portions 22, 22 formed in the sun visor side bracket 9 so that the panel side bracket 5 is united with the sun visor side bracket 9. As shown in FIGS. 9, 17, the mounting pawls 23, 23 are formed in a substantially L shape and go through an opening portion 42 formed in the trim 11 such that they face the sun visor side bracket 9.

The aforementioned panel side bracket 5 contains: circular hole portions 43, 43 which the grommet screws 8, 8 loosely engage with through the aforementioned opening portion 42; recess hole portion 44 for preventing a contact with the wire protecting member 36; and a trim holding pawl portion 45 for holding the trim 11.

Further, as shown in FIGS. 11, 17, the panel side bracket 5 contains the locking pieces 27, 27 each having the lock pawl 26, 26. The locking pieces 27, 27 are formed in a rectangular tongue drooping to the sun visor side bracket 9 and inserted into the hole portions 28, 28 formed in the sun visor side bracket 9. The lock pawls 26, 26 formed at an end of the locking pieces 27, 27 engage with the engaging convex portions 29, 29 of the lock arms 30, 30 formed on the sun visor side bracket 9.

<Structure of Cover>

As shown in FIG. 9, the cover 10 is mounted on an opposite side of the sun visor side bracket 9 to a side with which the panel side bracket 5 is united so as to cover the sun visor side bracket 9.

Figure 18A:
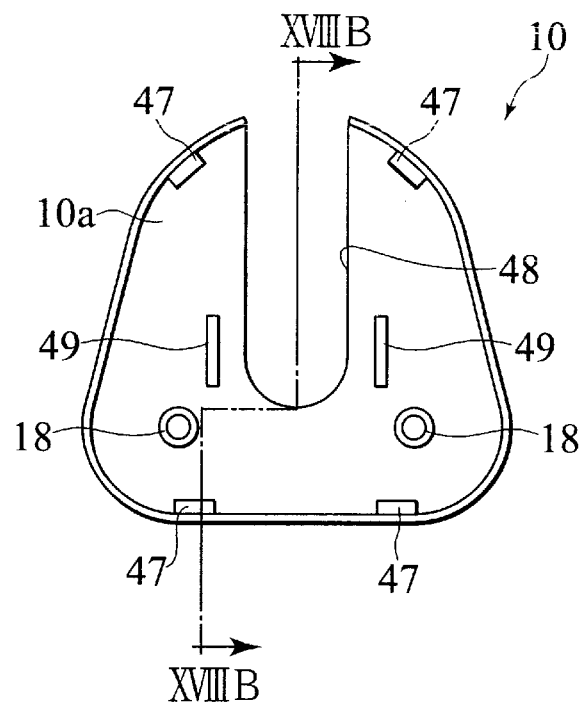
FIG. 18A is a plan view of the cover.
Figure 18B:
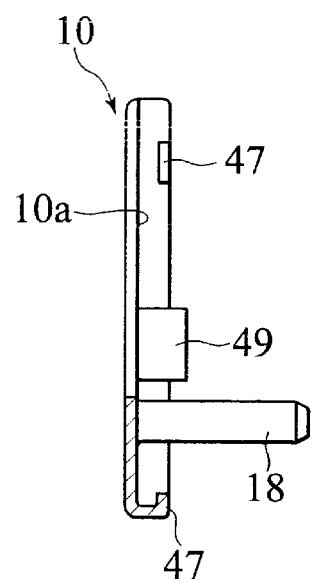
FIG. 18B is a sectional view taken along the line VVIIIB—VVIIIB and FIG. 18C is a lateral sectional view of the cover according to the embodiment.
Figure 18C:
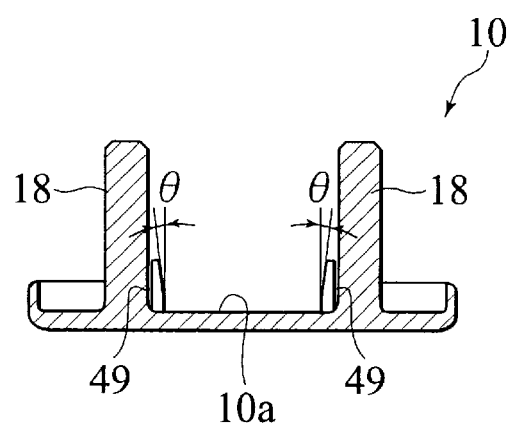
Figure 20:
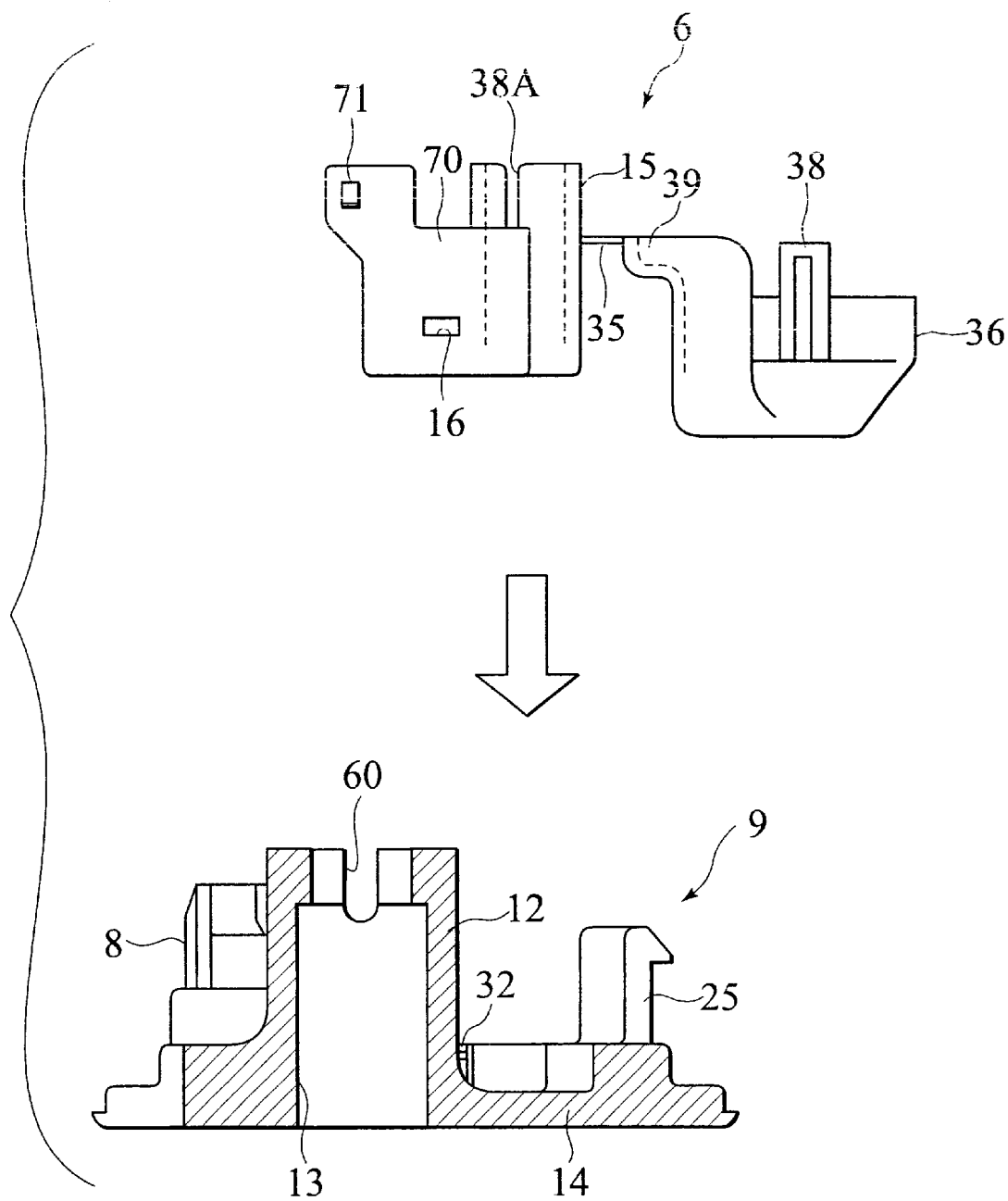
FIG. 20 is a side explanatory view showing a condition in which the female connector is installed to the bracket on the sun visor according to the embodiment.

As shown in FIGS. 9, 18, this cover 10 has plural assembly pawls 47, which are engaging pawls which engage with an outer peripheral portion of the sun visor side bracket 9 so as to fix the cover 10 to the sun visor side bracket 9.

Further, a cutout portion 48 is formed in the aforementioned cover 10 for the fixing shaft 3 to pass through. This cutout portion 48 is formed in the shape of a cutout groove formed from part of the outer edge of the cover 10 up to a position substantially in the center thereof. Additionally, the cover 10 has locking protrusions 49, 49 which are inserted into the flexible space formed in the sun visor side bracket 9 for pressing the lock arms 30, 30 against the locking pieces 27, 27 formed on the panel side bracket 5.

As shown in FIGS. 11, 18, the locking protrusions 49, 49 are formed in the shape of a rectangular tongue and then, formed at an angle of θ with respect to a vertical line such that a distance between opposing side; increases as it goes to an end thereof. That is, the locking protrusions 49, 49 are formed not at right angle with respect to an inner face 10a of the cover 10 but obliquely. If the locking protrusions 49, 49 formed in this way are inserted into the flexible space 31, the lock arms 30, 30 are pressed by the locking protrusions 49, 49 and then forced against the locking pieces 27, 27.

<Installation Method of Sun Visor>

The sun visor using the bracket 1 for installation onto the vehicle having the above described structure is installed onto the vehicle body in the following manner.

First, as shown in FIG. 9, the panel side bracket 5 is mounted on the trim 11. That is, with the mounting pawls 23, 23, the male connector housing 41, the locking pieces 27, 27, and the trim engaging pawls 45 facing the opening portion 42 formed in the trim 11, the aforementioned trim engaging pawl 45 is hooked on the trim 11 and then the panel side bracket 5 is mounted onto the opening portion 42 so as to cover it. Then, the trim 11 on which the panel side bracket 5 is mounted is fixed onto the inner panel 2.

Next, an end of the fixing shaft 3 is inserted into and held in the shaft fixing portion 12 of the sun visor side bracket 9. Then, the female connector portion 6 is mounted on top of the sun visor side bracket 9. Namely, the female connector housing 15 is disposed in the connector mounting portion 14 formed in the sun visor side bracket 9 such that the shaft fixing portion 12 is sandwiched by the side walls 70, 70 of the female connector 6. Sun visor side wires 32 are introduced out of the top opening of the shaft fixing portion 12 and passed on both sides of the shaft fixing portion 12 through the wire introducing cutouts 60, 60 formed in the top portion of the shaft fixing portion 12. Finally, the female connector terminals 33, 33 connected to each end of the sun visor side wires 32 are inserted into the slits 15a, 15a formed in both sides of the female connector housing 15 and disposed therein. After that, the hinge portions 35, 35 of the female connector portion 6 are bent so as to put the cap portion 36 on top of the shaft fixing portion 12. At this time, the sun visor side wires 32, 32 disposed on both sides of the shaft fixing portion 12 are covered with the wire cover portions 39, 39. Thus, the sun visor side wires 32 are covered with both the cap portion 36 and the wire cover portions 39, 39, so that no excess thereof is introduced onto the sun visor side bracket 9.

On the other hand, an end of vehicle side wire harness (not shown) placed on top of the inner panel 102 is connected to the male connector portion 4 of the panel side bracket S through the connector insertion hole 24 and then, the panel side bracket 5 is disposed between the trim 11 and the inner panel 102.

The sun visor side bracket 9 fixed to an end of the fixing shaft 3 in this way is united with the panel side bracket 5 across the trim 11. That is, with the grommet screws 8, 8, the wire protecting member 36, the female connector portion 6 and the hooking pawl portions 25, 25 facing the opening portion 42 in the trim 11, the sun visor side bracket 9 is united with the panel side bracket 5 by making the mounting pawls 23, 23 correspond to the uniting concave portions 22, 22 in the sun visor side bracket 9.

Meanwhile, the grommet screws 8, 8 face the circular hole portions 43, 43 formed in the panel side bracket 5 and the bracket mounting holes 7, 7 formed in the inner panel 2, so that a front end of each thereof is protruded into the space portion between the inner panel 2 and the outer panel. Further, the wire protecting member 36 face the recess hole portion 44 formed in the panel side bracket 5.

Figure 12:
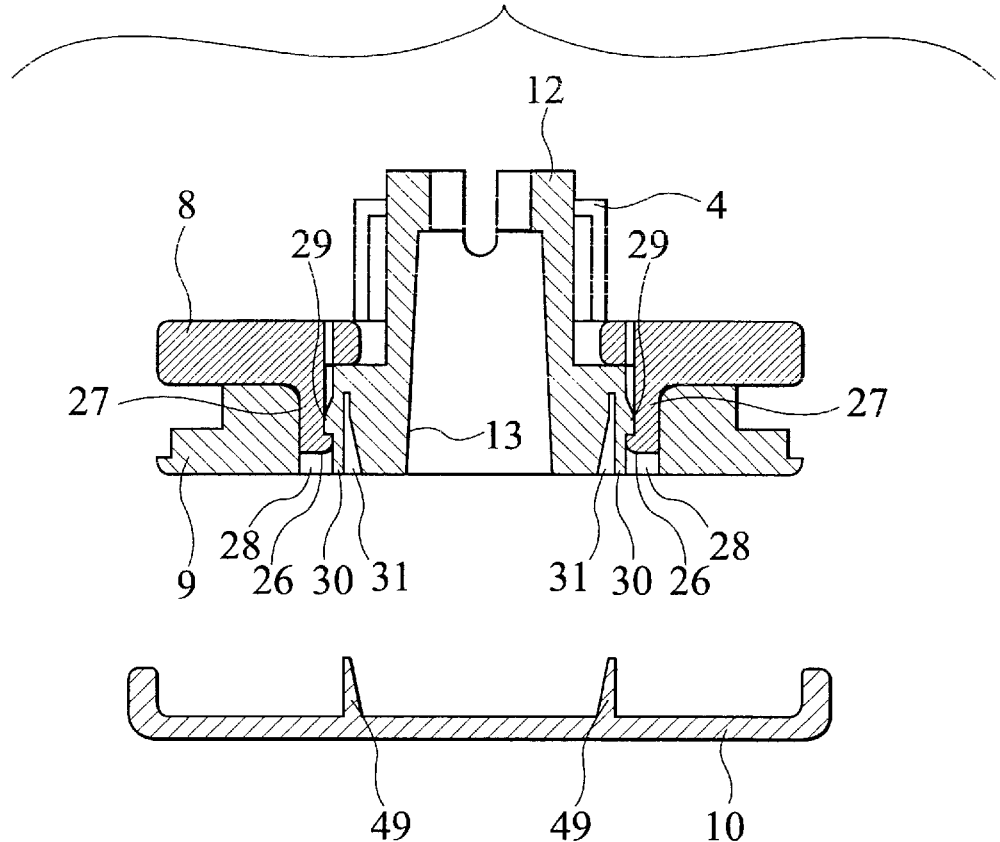
FIG. 12 is a sectional view showing a condition before a cover is attached to the second bracket united with the first bracket according to the embodiment.

When the sun visor side bracket 9 is united with the panel side bracket 5, the locking pieces 27, 27 formed on the panel side bracket 5 are inserted into the hole portions 28, 28 formed in the sun visor side bracket 9 and further, the male connector housing 41 of the male connector portion 4 is engaged with the female connector housing 15 of the female connector portion 6. If as shown in FIG. 12, the sun visor side bracket 9 is united with the panel side bracket 5, the male connector housing 41 is coupled with the female connector housing 15 and at the same time, the lock pawls 26, 26 of the locking pieces 27, 27 engage with the engaging convex portions 29, 29 of the lock arms 30, 30. When the lock pawls 26, 26 engage with the engaging convex portions 29, 29, the uniting condition between the panel side bracket 5 and the sun visor side bracket 9 is locked.

As shown in FIG. 11, the engagement between the lock pawls 26, 26 and the engaging convex portions 29, 29 can be confirmed visually through the hole portions 28, 28 formed in the sun visor side bracket 9. Thus, whether or not the panel side bracket 5 and the sun visor side bracket 9 are completely united with each other and whether or not the male connector housing 41 is coupled with the female connector housing 15 can be observed visually, so that an incomplete engagement of the connectors can be detected before installation of the sun visor is completed.

If as shown in FIG. 12, the lock pawls 26, 26 engage with the engaging convex portions 29, 29 properly, the male connector housing 41 is coupled with the female connector housing 15 securely and at the same time, the flexible space 31 keeps a desired space portion. Otherwise, the engaging convex portions 29, 29 are pressed by the lock pawls 26, 26 so that the lock arms 30, 30 are bent. As a result, the flexible space 31 becomes smaller or vanishes so that the male connector housing 41 and the female connector housing 15 are incompletely coupled with each other.

Figure 14:
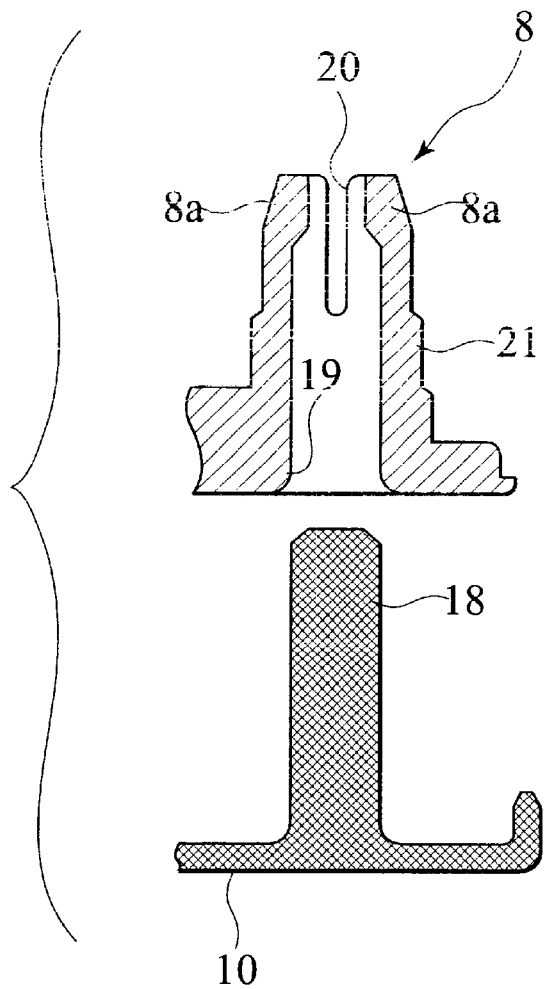
FIG. 14 is an enlarged sectional view showing a condition before a grommet screw protrusion is inserted into the grommet screw according to the embodiment.
Figure 15:
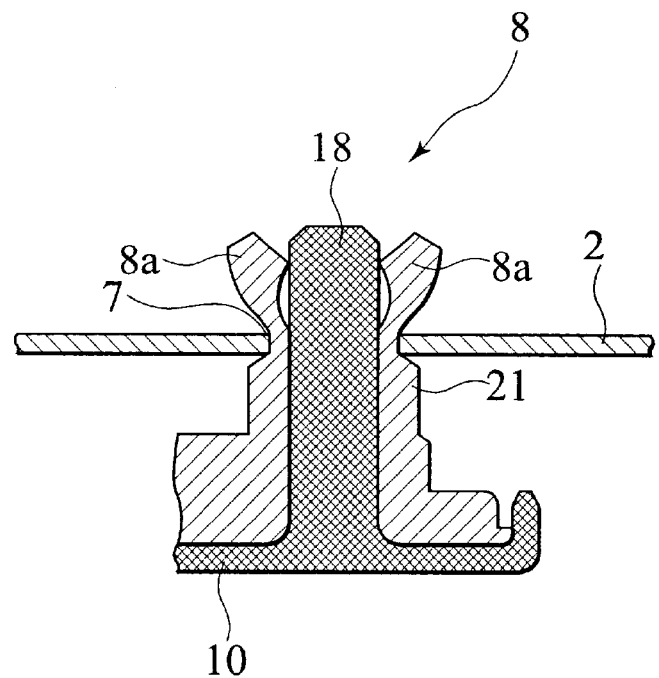
FIG. 15 is an enlarged sectional view showing a condition in which the grommet screw protrusion is inserted into the grommet screw according to the embodiment.

Next, as shown in FIG. 12, the cover 10 is attached to the sun visor side bracket 9. That is, as shown in FIGS. 12, 14, the grommet screw protrusions 18, 18 formed on the cover 10 are inserted into the central holes 19 in the grommet screws 8, 8. Consequently, as shown in FIG. 15, an end portion of each of the grommet screws 8, 8 is expanded by each of the grommet screw protrusions 18, 18. As a result, ends of the screw pieces 8a, 8a, 8a are opened so that the screw pieces 8a, 8a, 8a are pressed against the opening periphery of each of the bracket mounting holes 7, 7. Then, the bracket 1 for installation on the vehicle is secured to the inner panel 2.

Figure 13:
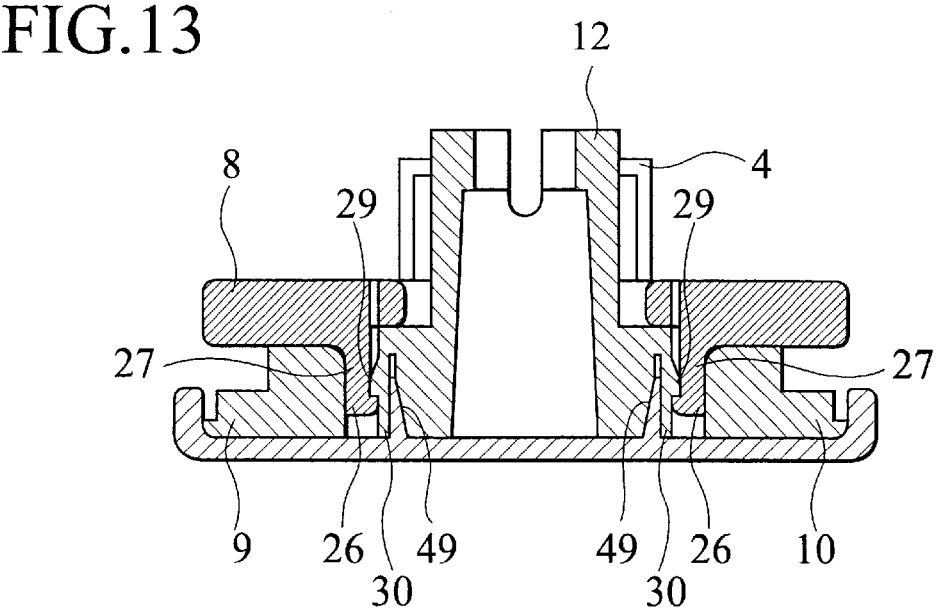
FIG. 13 is a sectional view showing a condition in which the cover is attached to the second bracket united with the first bracket according to the embodiment.
Figure 21:
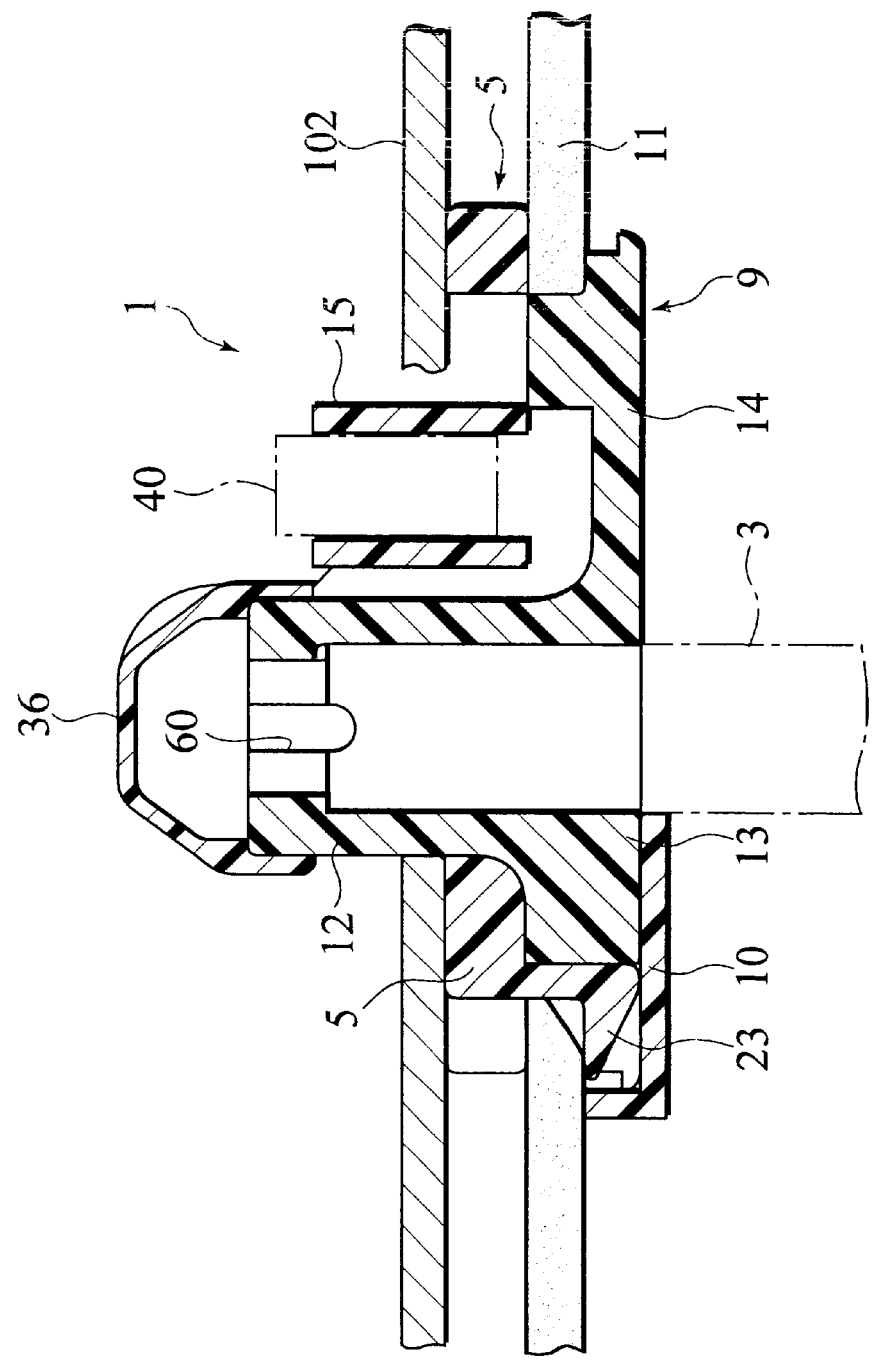
FIG. 21 is a sectional view showing an installation condition of the bracket for installation onto the vehicle according to the embodiment.

Further, the locking protrusions 49, 49 formed on the cover 10 enter the flexible spaces 31 in the sun visor side bracket 9. Then, as shown in FIG. 13, the lock arms 30, 30 are urged to the lock pieces 27, 27 formed on the panel side bracket 5 by the locking protrusions 49, 49 so as to intensify the engagement between the lock pawls 26, 26 and the engaging convex portions 29, 29. Then, finally, as shown in FIG. 21, the bracket 1 for installation on the vehicle is secured to the vehicle body.

As described above, according to the bracket for installing the subsidiary appliance to the vehicle body of this invention, only by attaching the cover 10 to the sun visor side bracket 9 by a single action, the bracket 1 can be fixed to the inner panel 2 simply and securely. Additionally, the necessity of screws for fixing the bracket is eliminated and the screw tightening work is eliminated, thereby making it possible to reduce the quantity of required parts and processing steps. Because an occurrence of improper screw tightening due to oblique tightening of the screw or the like is eliminated, a short-circuit generated by a contact between a screw and wire or connector can be prevented. Further, a damage of the bracket which may occur if a screw of improper size is used can be eliminated.

Further, according to the bracket for installing the subsidiary appliance to the vehicle body of this embodiment, by inserting the locking protrusions 49, 49 formed on the cover 10 into the flexible space 31 formed in the sun visor side bracket 9, the engagement between the lock pawls 26, 26 and engaging convex portions 29, 29 is further intensified, so that the uniting strength between the panel side bracket 5 and the sun visor side bracket 9 is increased. Further, the coupling between the male connector portion 4 and the female connector portion 6 is secured. Because the engagement between the lock pawls 26, 26 and the engaging convex portions 29, 29 cannot be released until the cover 10 is removed, connection failure which may occur due to removal of the connector is avoided.

According to the bracket for installing the subsidiary appliance to the vehicle body of this embodiment, if the engagement between the lock pawls 26, 26 and the engaging convex portions 29, 29 fails, the lock arms 30, 30 are pressed by the lock pawls 26, 26 so that the flexible space 31 becomes smaller or vanishes. Consequently, the locking protrusions 49, 49 formed on the cover 10 cannot enter the aforementioned flexible space 31 thereby indicating that the engagement between the female connector portion 6 and the male connector portion 4 is improper. That is, the engaging condition between the female connector portion 6 and the male connector portion 4 can be detected. Additionally, even if the cover 10 is attached, the engaging condition between the lock pawls 26, 26 and the engaging convex portions 29, 29 can be visually confirmed through the hole portions 28, 28 formed in the sun visor side bracket 9. Further, the engaging condition can be visually confirmed also by seeing a size of the flexible space 31.

Further, according to the bracket for installing the subsidiary appliance to the vehicle body of this embodiment, because the cover 10 is attached to the sun visor side bracket 9 by inserting the locking protrusions 49, 49 into the flexible space 31, if the direction of the cover 10 is mistaken, the cover 10 cannot be mounted to the sun visor side bracket 9, thereby making it possible to prevent the cover 10 from being mounted in a different way. Further, because the assembly pawls 47 are formed on the cover 10, the cover 10 is mounted firmly onto the sun visor side bracket 9, so that any abnormal noise is not generated by looseness or vibration of the cover 10.

Further, because according to this embodiment, the sun visor side wire 32 is protected by the cap portion 36 and the wire cover 39, the biting of the wire by the panels can be prevented upon installation. According to this embodiment, the female connector portion 6 and the male connector portion 4 can be connected completely by mounting the cover 10 with both the connector portions connected in a temporary condition. Further, according to this embodiment, because the female connector housing 15 is held in the sun visor side bracket 9 and simultaneously the male connector portion 4 is also held therein, the connector does not swing when the vehicle is traveling, so that an occurrence of abnormal noise can be prevented. Further, according to this embodiment, if erroneous installation occurs, for example, the female connector portion 6 is set apart from the sun visor side bracket 9, the sun visor side bracket 9 cannot be installed to the inner panel 102, thereby making it possible to detect that erroneous installation. Further, even if the female connector housing 15 is engaged with the male connector portion 4 incompletely, by mounting the cover 10 from a bottom of the sun visor side bracket 9, that incomplete engagement can be changed to complete engagement.

Although the embodiments of the present invention has been described above, the present invention is not restricted to those, but may be modified in various ways based on the gist of the structure of the invention. For example, although in the above described embodiment, the first connector is set to the female connector and the second connector is set to the male connector, of course, they may be constructed in reverse. Although in the above described embodiment, the sun visor is applied as the subsidiary appliance, it is needless to say that the present invention is also applicable to such a subsidiary appliance as a movable lamp.

What is claimed is:

1. A bracket for installing a subsidiary appliance onto a vehicle panel comprising:

a first bracket having a first connector;

a second bracket having a second connector which is coupled with said first connector when the second bracket is united with said first bracket and cylindrical grommet screws which are inserted into bracket mounting holes formed in said vehicle panel and engaged with the vehicle panel; and a cover to be mounted on said second bracket on an opposite side to a side with which said first bracket is to be united, wherein said first bracket has locking pieces each having a lock pawl and said second bracket contains hole portions in which said locking piece is to be inserted, so that a flexible space is formed with a lock arm having an engaging convex portion for engaging with said locking piece facing the hole portion, while said lock pawl engages with said engaging convex portion so that said first bracket is united with said second bracket.

2. A bracket for installing a subsidiary appliance onto a vehicle panel according to claim 1 wherein said cover has locking protrusions which are to be inserted into said flexible space so as to press said lock arms against said locking pieces.

3. A bracket for installing a subsidiary appliance onto a vehicle panel according to claim 1 wherein said cover has a grommet screw protrusion to be inserted into a central hole in said grommet screw and an end of said grommet screw protruded to a face on an opposite side to the bracket mounting face of said panel through said bracket mounting hole is pressed and expanded by said grommet screw protrusion so as to be pressed against an opening peripheral portion of said bracket mounting hole so that the bracket for installation onto the vehicle is fixed to said panel.

4. A bracket for installing a subsidiary appliance onto a vehicle panel according to claim 1 wherein said cover has a fitting pawl formed so as to engage with said second bracket.

5. A bracket for installing a subsidiary appliance onto a vehicle panel according to claim 1 wherein said subsidiary appliance is a sun visor for disposition on a vehicle roof portion.

6. A bracket for installing a subsidiary appliance onto a vehicle panel according to claim 1 wherein said second connector is held detachably by said second bracket.

7. A bracket for installing a subsidiary appliance onto a vehicle panel, comprising:

a first bracket having a first connector; and a second bracket having a shaft fixing portion for supporting a fixing shaft provided on the subsidiary appliance and a second connector in which a wire from the subsidiary appliance is introduced from said shaft fixing portion and a terminal of the wire is connected, wherein said first bracket is disposed between said a second bracket and a vehicle panel and said first bracket is engaged with and connected to the second connector held by the second bracket, wherein said second bracket has grommet screws protruded and by inserting grommet screw protrusions into the grommet screws in a condition that the grommet screw goes through said first bracket and said vehicle panel, said first bracket is nipped and fixed between said second bracket and said vehicle panel.

8. A bracket for installing a subsidiary appliance onto vehicle panel according to claim 7 wherein said second connector comprises a cap portion for covering a top portion of said shaft fixing portion and a wire cover portion for covering wire on subsidiary appliance placed from said shaft supporting portion to said second connector.

9. A bracket for installing a subsidiary appliance onto a vehicle panel according to claim 7 wherein said grommet screw protrusion is protruded from a cover for covering said second bracket.

10. A bracket for installing a subsidiary appliance onto a vehicle panel according to claim 7 wherein said subsidiary appliance is a sun visor for disposition on a vehicle roof portion.

11. A bracket for installing a subsidiary appliance onto a vehicle panel according to claim 7 wherein said second connector is held detachably by said second bracket.

* * * * *